(12) United States Patent
Spalink et al.

(10) Patent No.: US 6,983,379 B1
(45) Date of Patent: Jan. 3, 2006

(54) METHOD AND SYSTEM FOR MONITORING ONLINE BEHAVIOR AT A REMOTE SITE AND CREATING ONLINE BEHAVIOR PROFILES

(75) Inventors: Jan-Dieter Spalink, Durham, NC (US); Brian R. D. Gullette, Durham, NC (US); Andrew Hatchell, Cary, NC (US); Randall C. Nortman, Cary, NC (US)

(73) Assignee: Hitwise Pty. Ltd., Melbourne (AU)

( * ) Notice: Subject to any disclaimer, the term of this patent is extended or adjusted under 35 U.S.C. 154(b) by 844 days.

(21) Appl. No.: 09/608,136

(22) Filed: Jun. 30, 2000

(51) Int. Cl.
*G06F 11/30* (2006.01)
(52) U.S. Cl. .................... 713/201; 705/10; 705/74
(58) Field of Classification Search ........ 709/223–226; 713/201; 705/10, 14, 26, 74
See application file for complete search history.

(56) References Cited

U.S. PATENT DOCUMENTS

| | | | |
|---|---|---|---|
| 5,053,956 A * | 10/1991 | Donald et al. | 713/601 |
| 5,933,827 A | 8/1999 | Cole et al. | |
| 5,961,593 A * | 10/1999 | Gabber et al. | 709/219 |
| 5,991,735 A | 11/1999 | Gerace | |
| 6,018,619 A | 1/2000 | Allard et al. | |
| 6,128,624 A * | 10/2000 | Papierniak et al. | 707/104.1 |
| 6,151,584 A * | 11/2000 | Papierniak et al. | 705/10 |
| 6,446,200 B1 * | 9/2002 | Ball et al. | 713/1 |
| 6,463,533 B1 * | 10/2002 | Calamera et al. | 713/163 |
| 6,473,740 B2 * | 10/2002 | Cockrill et al. | 705/27 |
| 6,546,393 B1 | 4/2003 | Khan | |
| 6,553,367 B2 | 4/2003 | Horovitz et al. | |
| 6,601,173 B1 | 7/2003 | Mohler | |
| 6,631,496 B1 | 10/2003 | Li et al. | |
| 6,654,813 B1 | 11/2003 | Black et al. | |
| 6,792,458 B1 | 9/2004 | Muret et al. | |
| 6,804,701 B2 | 10/2004 | Muret et al. | |
| 2002/0021665 A1 * | 2/2002 | Bhagavath et al. | 370/229 |

FOREIGN PATENT DOCUMENTS

| | | |
|---|---|---|
| EP | PCT/IB 02-05540 | 10/2004 |
| GB | 2 346 229 A | 2/2000 |
| WO | PCT/EP99/08318 | * 11/1999 |
| WO | WO 00/57611 A2 | 9/2000 |
| WO | WO 01/25896 A1 | 4/2001 |

OTHER PUBLICATIONS

Schneier, B., Applied Cryptography, 1996, John Wiley & Sons, Second Edition, pp. 435-445.*
Rupp, B. et al., INDEX: A Platform for Determining how People Value the Quality of their Internet Access, May 1998, IEEE.*

(Continued)

*Primary Examiner*—Gilberto Barron, Jr.
*Assistant Examiner*—Minh Dinh
(74) *Attorney, Agent, or Firm*—A. José Cortina; Daniels Daniels & Verdonik, P.A.

(57) ABSTRACT

A method and system for monitoring users on one or more computer networks, disassociating personally identifiable information from the collected data, and storing it in a database so that the privacy of the users is protected. The system includes monitoring transactions at both a client and at a server, collecting network transaction data, and aggregating the data collected at the client and at the server. The system receives a user identifier and uses it to create an anonymized identifier. The anonymized identifier is then associated with one or more users' computer network transactions. The data is stored by a collection engine and then aggregated to a central database server across a computer network.

18 Claims, 5 Drawing Sheets

OTHER PUBLICATIONS

Korkea-aho, M., Anonymity and Privacy in the Electronic World, Nov. 1999.*

Sax M., Data Collection And Privacy Protection: An International Perspective, Aug. 1999, pp. 3-6 and 36-42.*

Web Pages printed Nov. 2, 2004 of Internet Draft entitled "Tunneling SSL Through a WWW Proxy", Luotonen, Ari, *Netscape Communications Corporation* (Dec. 14, 1995); 4 pages. http://muffin.doit.org/docs/rfc/tunneling_ssl.html.

* cited by examiner

METHOD AND SYSTEM FOR MONITORING ONLINE BEHAVIOR AT A REMOTE SITE AND CREATING ONLINE BEHAVIOR PROFILES

BACKGROUND OF THE INVENTION

This invention relates to a system and method for collecting computer network traffic, particularly Internet traffic, in a manner that does not associate personally identifiable information with network usage data, and creating online behavior profiles that are unassociated with individual users. Specifically, the system and method of the invention will permit Internet service providers (ISP) and online merchants to monitor transactions made over a secure or encrypted link such as the Secure Socket Layer (SSL), and to create behavior profiles without violating customer confidentiality.

The Internet has rapidly grown into a center for conducting commerce with unprecedented efficiency and commercial advantage; however, the Internet also presents numerous new challenges to the development and execution of appropriate business models and processes. To design and implement effective marketing and business plans, companies need to gain a better understanding of consumer behavior and preferences while they are conducting Internet commerce.

In the current Internet world, it has become desirable for service providers and merchants to obtain specific information about Internet users for the purpose of improving the marketing of products and services, and tailoring products and services to meet the requirements of specific customer types. In order to obtain the most effective data, it is desirable to aggregate usage data from companies that provide Internet access to their employees, and from ISPs that provide access to subscribers.

However, the collection of Internet transaction data raises many concerns about consumer confidentiality and privacy. First, participating companies and ISPs desire to maintain the confidentiality of their business information such as the number of subscribers, the geographical locations of each subscriber, and general usage data.

Additionally, many users are averse to having their actions monitored and tracked. Security concerns about the Internet have prevented many users from completing online transactions. Other users have completely stayed away from the Internet because of fears that their private information might become available to third parties in an uncontrolled manner.

Therefore, it is desirable to obtain detailed information about the behavior of users while ensuring subscriber, employee, and company privacy.

Today, there are several major approaches to collecting Internet transaction data. The first is through traditional polling techniques. In this method, user behavior profiles are developed from users' answers to questionnaires regarding their Internet use. Unfortunately, this technique suffers from bias and fails to provide the detail that marketers need.

The next approach to collecting network transaction data is by using logfiles generated by network devices such as Web servers and proxies. Logfiles provide increased detail and accuracy compared to polling techniques; however, they fail to protect user privacy and confidentiality. Logfiles generally contain a username or an Internet Protocol (IP) address that can be used to tie behavior to a particular individual. Additionally, Web server logfiles alone are ineffective in characterizing user behavior because they only contain the cross-section Internet traffic going to that Web server; the Web server logfiles are unable to accurately capture the behavior of a consumer who accesses multiple Web sites to assist in making purchasing decisions.

The last general approach to collecting network transaction data involves the use of unique identifiers called "cookies" inserted into an Internet browser. When the user accesses a Web site on the Internet, the Web server can read the inserted cookie to obtain the unique identifier and then store details about the current transaction associated with the unique identifier. This method fails to capture Internet usage for users that have cookies disabled on their browsers and also fails to capture Internet usage on Web sites that do not participate in capturing and aggregating usage data. Since the captured data is not complete, any behavior profile created using the data cannot be representative of Internet usage in the aggregate.

In building accurate user profiles, it is desirable to know the behavior and actions that lead up to a purchase. For example, it would be desirable to know that many users searched one online merchant site for books to purchase and then went to a different online merchant site to make the actual purchase. Since most transactions made on the Internet employ some security mechanism, such as SSL, to protect sensitive customer information (e.g., credit card numbers, addresses, and purchase information), it can be difficult for a monitoring system to determine whether a purchase was made, much less determine what was purchased.

Under current Federal Communications Commission (FCC) regulations, companies may have to provide protection of customer proprietary network information. By monitoring and recording detailed network information about individuals using logfiles or cookies, companies may be in violation of these FCC regulations. To date, there has been no effective way of obtaining online customer behavior profiles to allow service providers and merchants to tailor products and services better without possibly violating government regulations.

It becomes desirable, therefore, to provide a method and system where such information can be obtained while still maintaining the confidentiality of the customer (e.g., by characterizing such data in a such a manner that it is free of personally identifiable information).

SUMMARY OF THE INVENTION

In accordance with the invention, a method is provided for collecting network 1 transaction data. The method includes obtaining an identifier that represents one or more users of a computer network and using the obtained identifier to create an Anonymized Identifier (AID)—defined as an identifier stripped of all personally identifiable information. The method further includes collecting data that is transmitted across a computer network as well as collecting transaction data recorded by a merchant system. The collected transaction data is used to create one or more transaction codes. The anonymized identifier is associated with the collected data and the one or more transaction codes and is used to create a transaction record including one or more transaction codes and an anonymized identifier. The resulting transaction record is then stored in a database.

In a further aspect of the invention, each user identifier is converted to an anonymized identifier for each session through the use of hash encryption. User profiles are then created using only the anonymized identifier for each user.

In another, more specific aspect of the present invention, a user profile is created by characterizing the online behavior of each user. The amount of time typically spent by each user for each connection can also be determined. Yet still further, users can be characterized as belonging to groups of users in specified regions of the country.

BRIEF DESCRIPTION OF THE DRAWINGS

Having thus briefly described the invention, the same will become better understood from the following detailed discussion, taken in conjunction with the drawings wherein.

DETAILED DISCUSSION OF THE INVENTION

Figure 1:
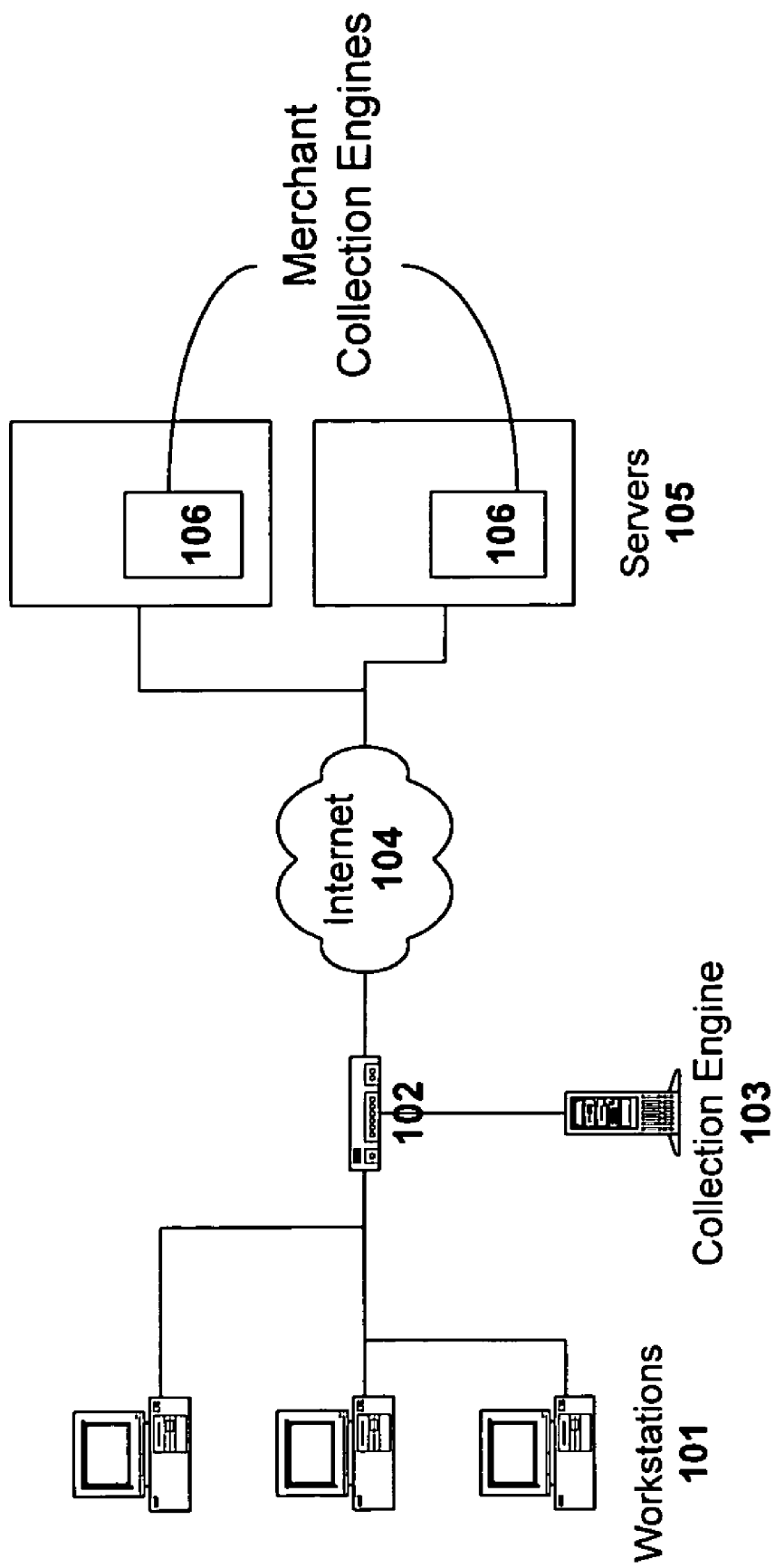
FIG. 1 is a general system schematic diagram showing users connected to a point of a presence ISP, which is in turn connected to the Internet, and then illustrated connected typically to an ISP which connects to a Web server.

The first embodiment of the present invention provides a system and method for collecting network transaction data without associating personally identifiable information s with such data. According to this embodiment, users 101 log on to an Internet Service Provider (ISP) 102 in the conventional manner in order to access the Internet 104. Once connected, a user 101 can use a network browser such as Microsoft™ Internet Explorer™ or Netscape™ Communicator™ to access Web servers 105 on the Internet 104.

According to an embodiment of the present invention, a collection engine 103 is coupled to the ISP 102 in such a manner that the collection engine 103 can monitor packets sent between users 101 and the Internet 104. The collection engine 103 is a passive device that monitors network traffic, collecting data about network transactions and recording them in a database.

If the connection is encrypted using SSL, then collection engine 103 can identify the IP addresses of the hosts involved in the transaction; however, the engine cannot view the contents of the encrypted datastream and thus cannot determine whether a transaction is completed. In order to determine whether the user completes a transaction, a merchant collection engine 106 records the IP addresses of a host completing the transaction along with a transaction code in a database.

In the preferred embodiment, the merchant collection engine 106 is implemented as a software application running on a merchant Web server. The software includes two components: (1) a daemon for listening and responding to User Datagram Protocol (UDP) status requests; and (2) script implemented using the Common Gateway Interface (CGI) for logging transaction code information. The script is integrated into the merchant's purchasing system and will vary depending on the configuration of the merchant's system. For example, if the merchant uses an Active Server Page (ASP) written in Visual Basic™, a line can be added to the current system to run a script that logs the transaction. The script takes as input the transaction code and the IP address of the purchasing host.

The merchant collection engine can be implemented in many different ways. In additional embodiments of the present invention, the merchant collection engine 106 runs on a multi-tier application server or on a separate server machine. Also, in additional embodiments, the merchant collection engine 106 is implemented using the Netscape Server Application Programming Interface™ (NSAPI), Microsoft™'s Internet Server Application Programming Interface™ (ISAPI), Java™ servlets, or any other Web server technology.

The transaction code can represent any information that a merchant wishes. In the preferred embodiment of the present invention, transaction codes must be chosen such as not to compromise the privacy of users. For example, in the preferred embodiment, the transaction code includes two characters. The first character represents the category or categories for the order. The character is a hexadecimal represented by a series of bits, each bit signifying a category as shown in the following table:

| Bit Position | Category |
| --- | --- |
| 0 | Books |
| 1 | Electronics |
| 2 | Software |
| 3 | Office Supplies |

Thus, an order including a purchase of books and electronics would have bits 0 and 1 set. Thus, the first character would be the binary representation 0011, which is equivalent to 3. If an order includes office supplies and electronics, the first character would be 1010, or A.

The second character represents the method of payment used by the purchaser according to the following table:

| Character | Payment Method |
| --- | --- |
| A | American Express |
| B | Discover |
| C | Mastercard |
| D | Visa |
| E | Non-Credit |

Thus, the two-character transaction code "3D" represents that a customer purchased books and electronics using a Visa card. One of ordinary skill in the art will readily appreciate an abundance of data that can be encoded in a transaction code other than that shown in this representative example. Additional embodiments use multiple transaction codes.

In an additional embodiment, a three-character transaction code is used representing a price range as shown in the following table:

| Character | Price Range |
|---|---|
| A | $0.00–$10.00 |
| B | $10.01–$20.00 |
| C | $20.01–$30.00 |
| E | $30.01–$40.00 |
| F | $40.01–$50.00 |
| G | $50.01–$100.00 |
| H | $100.01–$150.00 |
| I | $150.01–$200.00 |
| J | $200.01–$250.00 |
| K | $250.01–$500.00 |
| L | $500.01–$1000.00 |
| M | Over $1000.00 |

In order for the collection engine 103 to create online behavioral profiles that are unassociated with individual users, the present invention uses an anonymized identifier to represent an individual user. In this embodiment of the present invention, the anonymized identifier is obtained from the username of the individual user. However, to maintain user anonymity, it is imperative that the original username cannot be obtained from the anonymized identifier. The present embodiment applies a one-way hashing function to the login usernames. One-way hashing functions, such as Message Digest 4 (MD4), Message Digest 5 (MD5), Secure Hashing Algorithm 1 (SHA-1), etc., are commonly used in cryptography applications including digital signatures.

Figures 2A, 2B:
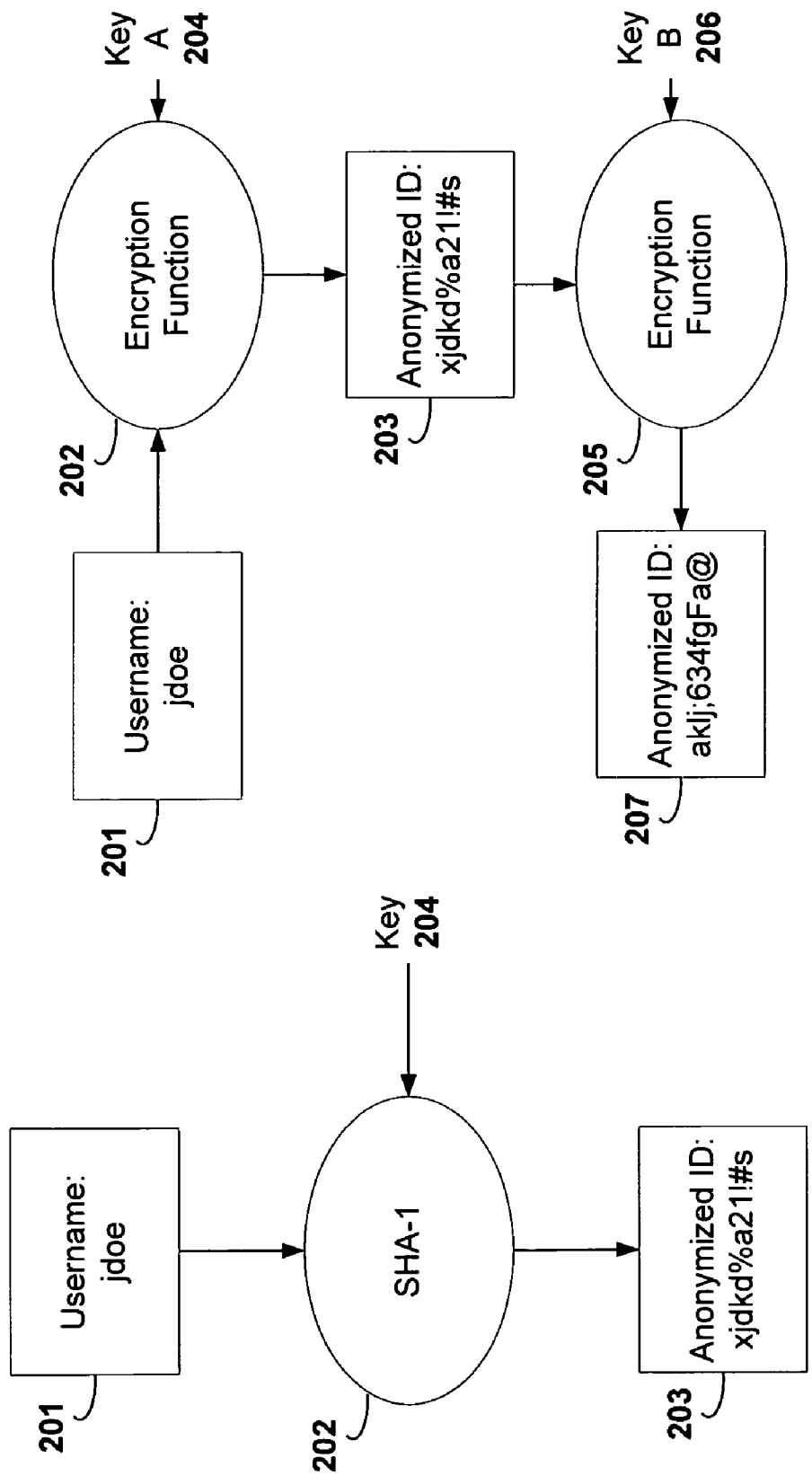
FIG. 2A is a schematic diagram illustrating how encryption is used to take a user's ID and create an Anonymized Identifier (AID) for purposes of tracking the session record in a transaction database.
FIG. 2B is a schematic diagram illustrating a two-pass encryption method for taking a user ID and creating an anonymized identifier for tracking user sessions.
Figure 3:
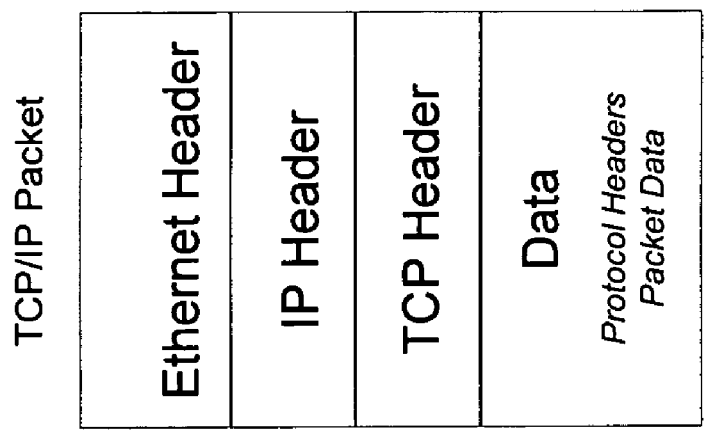
FIG. 3 is a block diagram of a typical data packet illustrating how data is extracted to determine the user's connections to the host and the number of page hits which can be tracked in accordance with the invention.

FIG. 2A shows an example of a unique identifier 203 being created from a username 201 and a key 204 using a one-way hashing function 202. In this example, the one-way hashing function is the Secure Hashing Algorithm (SHA) developed by the National Institute of Standards and Technology (NIST) and published as a Federal Information Processing Standard (FIPS PUB 180). The key 204 is appended to the username 201. One-way hashing function 202 is applied to the combined key 204 and username 201 to produce the anonymized identifier 203. Use of the key 204 makes it more difficult to decrypt the anonymized identifier and using a unique key for each ISP ensures usernames or other identifiers are unique across ISPs. One of skill in the art will readily appreciate that any other one-way hashing algorithm can be used with the present invention.

FIG. 2B shows a two-pass method for creating online behavioral profiles that are unassociated with individual users. This two-pass method is similar to the one-pass method shown in FIG. 2A. In this embodiment, a first anonymized identifier is creating as discussed above with regard to FIG. 2A. Then, the first anonymized identifier encrypted using one-way hashing function 205 along with key B 206 to create a second anonymized identifier 207. The two-pass technique allows a third party to assist without compromising the security of the resulting collected data.

When a user logged on to an ISP accesses a Web page located on a server 105, the user's workstation 101 opens a network connection to the desired server 105 using the Internet Protocol (IP). The network packets sent between workstation 101 and server 105 contain the network address of both devices; however, the packets do not contain a username. Thus, the collection engine 103 needs to associate a unique identifier 203 with a network IP address to record the transaction without tracing it to the individual user.

In order to create a unique identifier 203 and associate it with an IP address, the collection engine 103 needs to obtain a username. In one embodiment of the present invention, the collection engine 103 monitors the network for packets containing authentication information that associate a user identifier with an IP address. For example, if the ISP 102 is using RADIUS to authenticate users, then the RADIUS server sends an authentication timestamp containing a username associated with an IP address whenever a user successfully logs on to the network.

In alternative embodiments of the present invention, other authentication mechanisms may be used. In most cases, the user identifier and IP address are sent across the network unencrypted and can be obtained by the collection engine 103; however, some authentication mechanisms may use encryption or may not be sent across the network. In some instances, the access server is configured to suggest an IP address to the RADIUS server 107; if the address is not taken, the RADIUS server 107 sends back a packet allowing the assignment. In these cases, one of ordinary skill in the art using conventional software development techniques can develop software to obtain the user identifier/IP address correlation. Some other methods that are commonly used to assign IP addresses to users are Dynamic Host Configuration Protocol (DHCP) and Bootp.

In one embodiment of the present invention, a collection engine 103 is an Intel™—based computer running LinuX™. In order to maintain a high degree of security, the operating system is hardened using conventional techniques. For example, the "inetd" daemon and other unnecessary daemons are disabled to limit the possibility that an unauthorized user could gain access to the system. The collection engine 103 also includes one or more network interface cards (NIC) that allow the operating system to send and receive information across a computer network.

In some embodiments of the present invention, Internet network traffic and authentication network traffic may be sent across different networks. In this case, the collection engine 103 can use multiple NICs to monitor packets sent across the different networks. Additionally, a site may wish to monitor user activity on multiple networks. The collection engine 103 can monitor as many sites as the situation demands and the hardware supports.

Using the network and hardware configuration discussed above, we now turn to the software implementation of the collection engine 103. In accordance with the present invention, application software is installed, that has been developed in a manner that is conventional and well-known to those of ordinary skill in the art, at the point-of-presence (POP) location with an ISP.

Figure 4:
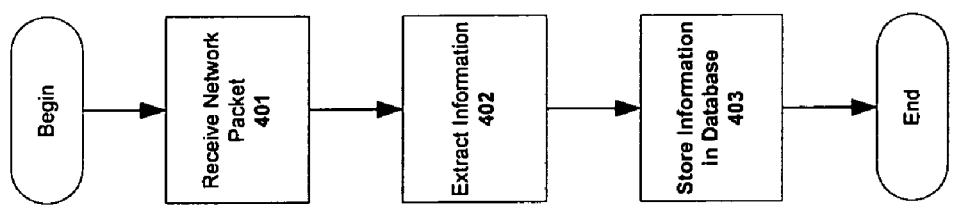
FIG. 4 is a block diagram of a typical method for collecting network transaction data whereby a system receives a network packet, extracts information from that packet, and stores the resulting information in a database.
Figure 5:
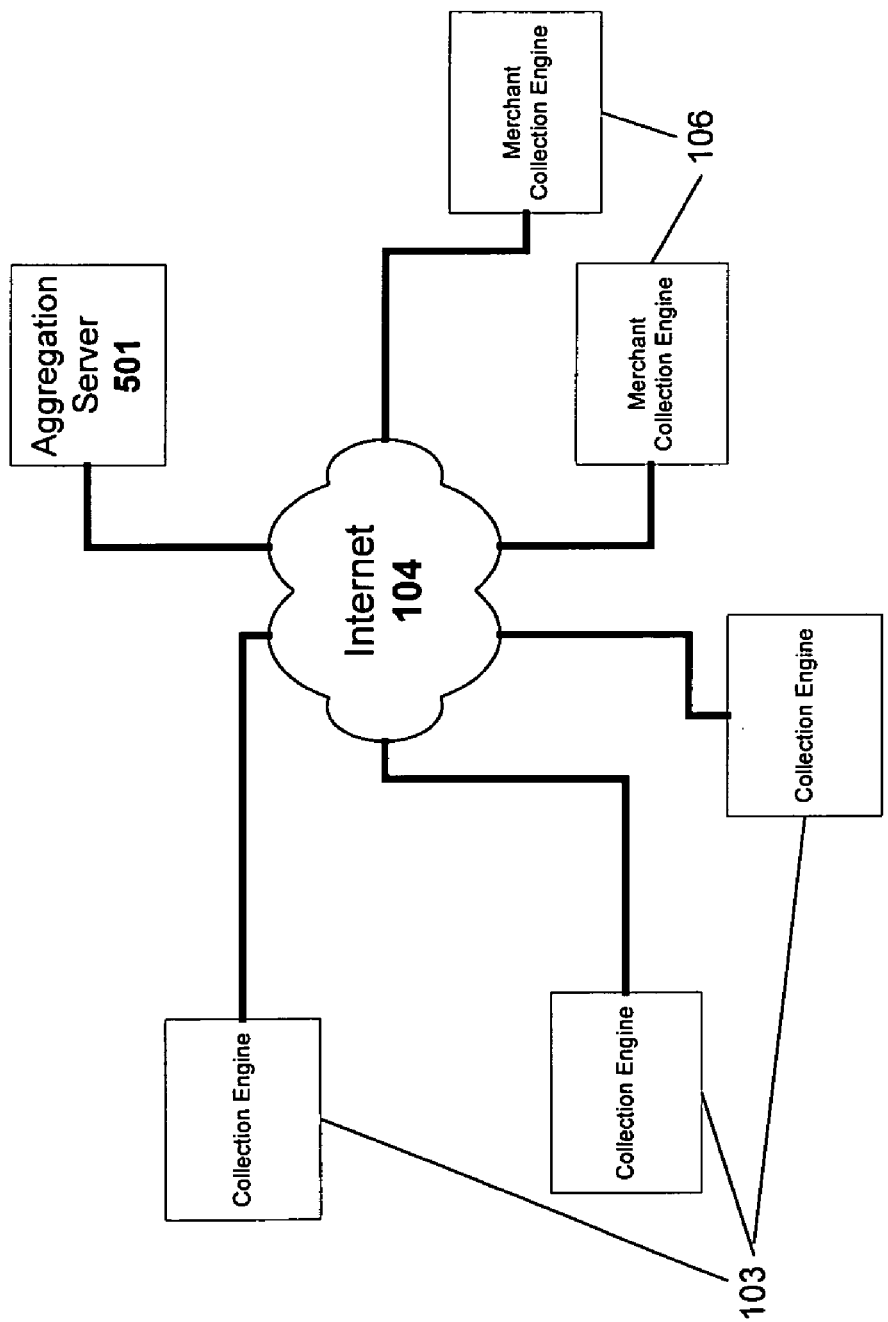
FIG. 5 is a general schematic diagram showing a configuration of a plurality of collection engines coupled to the Internet and an aggregation server coupled to the Internet whereby the aggregation server collects and aggregates information stored on the various collection engines.

The software includes a process that monitors packets sent across the device's network interfaces as shown in FIG. 4. This embodiment of the present invention begins by waiting for a network packet to be received. When a network packet is received in block S 401, relevant data is extracted from the packet in block 402. The relevant data depends on the protocol of the received packet. For example, if the packet is a RADIUS packet, the relevant data would include a user identifier, an IP address, and the time of authentication. If the packet is an HTTP packet, the system extracts the relevant header information including the size of the packet and the source and destination IP addresses, and records this information along with the date and time of the request. In addition, the system also records the requested Uniform Resource Locator (URL). For other packet types, the system extracts information including the source and destination IP addresses, the source and destination ports, the size of the packet, and the time of transmission.

In the preferred embodiment of the present invention, the collection engine 103 is aware of several standard protocols including HTTP, FTP, ReatAudio™, RealVideo™, and Windows Media™. When network interactions are made using one of these protocols, the collection engine 103 can collect additional information such as the name of the files requested.

One embodiment of the present invention also provides additional capabilities to track user sessions. For example, when a user is browsing a Web site, the user makes a series of LD separate requests to a Web server. In fact, a user may make several separate requests to a Web server in order to show a single Web page. When analyzing the behavior of a user to create a profile, it is useful to think of the related requests in terms of a single session instead of as multiple sessions. For example, when a user requests a Web page, the text of that Web page is downloaded along with each image referenced by that page. The user may then browse multiple pages within that Web site.

In one embodiment of the present invention, the collection engine 103 records the beginning of an interaction in a datastore when an initial HTTP network connection is opened. The system also records the time when that interaction was opened. Additional HTTP requests are determined to be within the same interaction until the interaction ends. In one embodiment of the present invention, interactions end after an inactivity period. In an additional embodiment of the present invention, interactions remain active for Transmission Control Protocol (TCP) connections until the connection is closed using TCP flow control mechanisms.

Once data has been collected by a collection engine 103, the data can be aggregated with data collected by other collection engines. For example, an ISP may have multiple POPs and may use a collection engine to collect data at each POP. The resulting data can then be aggregated by a central aggregation server 501.

In one embodiment of the present invention, an aggregation server 501 is connected to the Internet 104 through a conventional mechanism. Additionally, one or more collection engines 103 are connected to the Internet 104, as well as one or more merchant collection engines 106. The aggregation server 501 can access each of the collection engines 103 and merchant collection engines 106 to configure and maintain them, as well as to receive network transaction data.

As discussed above, efforts are taken to maintain the security of each collection engine 103. For this reason, a secure mechanism for logging on to collection engines 103 and merchant collection engines 106 and a secure mechanism to retrieve data are desirable. One embodiment of the present invention uses the Secure Shell (SSH) to provide strong authentication. This helps prevent unauthorized access to the server. SSH also provides a mechanism for encrypting the datastreams between collection engines 103 and an aggregation server 501. One of ordinary skill in the art will appreciate that many additional forms of secure login can be used, including one-time password systems and Kerberos™.

As stated above, the aggregation server 501 performs two major tasks: (1) configuration and management of collection engines 103 and merchant collection engines 106; and (2) aggregating data from the engines.

In one embodiment of the present invention, the aggregation server 501 monitors each collection engine 103 using a protocol based on the User Datagram Protocol (UDP). Every five minutes, a collection engine 103 sends a UDP packet to the aggregation server 501 signifying that the collection engine 103 is still alive. Additionally, the UDP packet also specifies the amount of data collected and the number of users currently using the system. In this manner, the aggregation server 501 can be alerted when a collection engine la 103 crashes, loses its network connection, or stops collecting data. This permits the effective management of the collection engines 103 from a central aggregation server 501.

Additionally, the aggregation server 501 monitors each merchant collection engine 106 using a UDP-based protocol in a manner similar to that used with collection engines 103. In one embodiment, the UDP-based protocol specifies the number of transactions recorded s and the number of transactions pending.

In alternative embodiments of the present invention, the collection engines 103 and the merchant collection engines 106 implement a Simple Network Management Protocol (SNMP) Management Information Base (MIB). The MIB includes information such as the time the server has been active, the amount of datastored on the server, and the number of active users and network sessions.

The aggregation server 501 also performs the additional task of collecting and aggregating data from the various collection engines 103 and merchant collection engines 106. The data is collected once per day by the aggregation server 501 through a secure SSH connection as discussed above. The data is then initially validated so that corrupt packet information is removed and the data is sorted to facilitate loading into the central datastore.

In some embodiments of the present invention, the collection engines 103 and 106 do not have enough storage to permit one collection every twenty-four (24) hours. In these cases, the aggregation server can collect data from the collection engine more often than every 24 hours. In one embodiment of the present invention, the UDP-based management protocol discussed above can be used to determine when a collection needs to be scheduled. In addition to the information discussed above, the UDP-based management protocol also includes the percentage of collection storage that has been used. A threshold can be set to initiate a collection. For example, if a collection engine 103 or a merchant collection engine 106 sends a UDP-based management protocol packet stating that it has used 70% of its storage capacity, then the aggregation server can initiate the process of aggregating the data from that collection engine as discussed above.

In one embodiment of the present invention, aggregation server 501 is a Sun™ Enterprise 6500™ server with sixteen (16) Sparc Ultra II™ processors and four (4) Fiber Channel connections to an EMC™ disk array. The aggregation server 501 includes an Oracle™ database that is configured to store data retrieved from the various collection engines 103 and 106.

In one embodiment of the present invention, the aggregation server 501 stores the following information that is retrieved from the various collection engines 103: (1) ISP, a representation of an ISP that collects data; (2) POP, a representation for a particular point of presence within an ISP; (3) AID, an anonymized user identifier; (4) Start Date, the date and time that an interaction began; (5) End Date, the date and time that an interaction ended; (6) Remote IP, the IP address of remote host (e.g., the IP address of a Web server being accessed by a user); (7) Remote Port, the port of the remote computer that is being accessed; (8) Packets To, the total number of packets sent during the interaction; (9) Bytes To, the total number of bytes sent to the remote server during an interaction; (10) Packets From, the total number of packets received from the remote computer; (11) Bytes From, the total number of bytes received from the remote computer; and (12) IP Protocol, the protocol code used during the interaction. For example, FIG. 6 shows a typical data table for the aggregation server.

Protocols such as the Hypertext Transfer Protocol (HTTP) and the File Transfer Protocol (FTP) contain additional information that can be useful in describing user behavior. One embodiment of the present invention collects additional information for these protocols. For example, FIG. 7 shows a representative data table containing additional HTTP information as follows: (1) HTTP Host, the hostname sent as part of the HTTP request; (2) HTTP URL, the Uniform Resource Locator requested; (3) HTTP Version, the HTTP version sent as part of the request.

The various embodiments of the present invention discussed above maintain the anonymity of the user by creating and using an anonymized identifier; however, the URL used in an HTTP request may contain identifying data. One embodiment of the present invention attempts to strip identifying data from URLs before storing them. According to this embodiment, the system searches for the following words within a URL: "SID", "username", "login", and "password". If these are found, the system strips the associated identifying information. For example, if the URL were "/cgibin/shop.exe/?username=bob", then the system would strip "bob" from the URL so that this identifying information would not be stored in the aggregated database.

In one embodiment of the present invention, the aggregation server includes database associating anonymized identifiers with a classification. For example, in one embodiment, the classification is the physical location of the user. This information is determined using the address of the user. There are commercial applications available that will translate a well-formed address into a Census block code identifying the general location of that address.

In another embodiment of the present invention, anonymized identifiers are associated with job functions. For example, a company may wish to monitor how classes of employees are using computer network resources. An anonymized identifier representing a single employee can be associated with a job function classification so that network utilization by employees with the same job function classification can be aggregated. One of ordinary skill in the art will readily appreciate that other classification systems can be used with the present invention.

The transaction codes collected from the merchant collection engines 106 are associated with anonymized identifiers by matching IP addresses associated with transaction codes, and those associated with anonymized identifiers. In this manner, the system can record information about transactions made across the Web.

For example, if a user logs on to the Internet through an ISP, he/she is assigned a dynamic IP address. The collection engine 103 stores the IP address or the hashed IP address of the user and associates it with an anonymized identifier. Then, every connection made by that user is logged together with other information including the IP address, the anonymized identifier, the time, the destination IP address, and the protocol being used. If the user accesses Amazon.com™ and makes a purchase, the collection engine 103 does not know whether a purchase was made or not; however, the collection engine 103 can determine all of the Web sites visited during the user's session. The aggregation server 501 retrieves all the information about the user's connections to Amazon.com™ from the collection engine 103; however, that collection engine cannot determine whether a purchase was made. If Amazon.com™ were running a merchant collection engine 106, then a transaction code containing information about the purchase would have been logged. The aggregation server 501 can collect the information from both collection engines and aggregate it into a single database so that the data can be analyzed to determine the actions that led to a purchase.

As discussed above, various embodiments of the present invention permit the collection of network utilization data while ensuring the privacy of individual users. In the embodiments discussed above, the system maintains the IP addresses of users in order to match data collected on the client side with data collected on the merchant side. The use of IP addresses alone can weaken the privacy-protection features of various embodiments of the present invention by providing an identifier that can possibly be traced to a particular user. In this embodiment, the IP addresses are hashed in a manner analogous to user identifiers.

Embodiments of the present invention have now been generally described in a non-limiting matter. It will be appreciated that these examples are merely illustrative of the lb present invention which is defined by the following claims. Many variations and modifications will be apparent to those of ordinary skill in the art.

What is claimed is:

1. A method for collecting transaction data generated by users accessing a network through an internet service provider without associating personally identifiable information with the transaction data, comprising:

obtaining an identifier from an internet service provider representing one or more users of a computer network;

creating an anonymized identifier using the obtained identifier at the internet service provider;

collecting data being transmitted across the computer network from the internet service provider;

collecting transaction data recorded by a merchant system on the network which is separate from the internet service provider, said collecting being done at the merchant system for transactions conducted between the merchant and one or more users of the computer network;

creating one or more transaction codes using the collected transaction data at the merchant system;

associating the anonymized identifier with the collected data and the one or more transaction codes;

creating a transaction record including one or more transaction codes and an anonymized identifier, storing the transaction record in a database separate from the internet service provider and the merchant system.

2. The method of claim 1, wherein the anonymized identifier is created by applying a one-way hashing function to the obtained identifier.

3. The method of claim 1, wherein the anonymized identifier is created by applying a one-way hashing function to the obtained identifier and a security key.

4. The method of claim 3, wherein the one-way hashing function is the Secure Hashing Algorithm 1 (SHA-1) algorithm.

5. The method of claim 3, wherein the one-way hashing function is the Message Digest 4 (MD4) algorithm.

6. The method of claim 3, wherein the one-way hashing function is the Message Digest 5 (MD5) algorithm.

7. The method of claim 1, wherein the act of obtaining an identifier representing one or more users of a computer network includes:

receiving packets sent by an authentication server; and extracting an identifier form the received packets.

8. The method of claim 7, wherein the authentication server is a RADIUS authentication server.

9. The method of claim 8, wherein the received packets are RADIUS authentication timestamp packets.

10. The method of claim 1, wherein the transaction code identifies whether a purchase was made.

11. The method of claim 1, wherein the transaction code identifies one or more categories of services or merchandise.

12. The method of claim 1, wherein the identifier is a network address.

13. The method of claim 12, wherein the network address is an Internet Protocol (IP) address.

14. A computer system for collecting network transaction data generated by users accessing a network through an internet service provider without associating personally identifiable information with the transaction data comprising:
- a communication port coupled to a computer network, the computer network providing access to one or more provider collection engines at internet service provider sites and one or more merchant collection engines at merchant sites;
- one or more processors; and
- memory containing computer instructions that collect network transaction data from the one or more provider collection engines at the internet service provider sites, wherein the network transaction data includes one or more anonimized identifier, and wherein the one or more anonimized identifiers are created at an internet service provider site using an identifier obtained at the internet service provider;
- collect transaction records from the one or more merchant collection engines at the merchant sites for transactions conducted between the merchant and one or more users of the computer network, and the merchant sites being separate from the internet service provider sites;
- associate the collected transaction records with the collected network transaction data; and
- store the associated data in a database separate from the internet service provider collection engines and the merchant collection engines.

15. A method for collecting transaction data generated by users accessing a network through an internet service provider without associating personally identifiable information with the transaction data, comprising:
- obtaining an identifier from an internet service provider representing one or more users of a computer network;
- creating an anonymized identifier using the obtained identifier at the internet service provider;
- obtaining data at the internet service provider representing data transmitted across the computer network;
- creating one or more transaction codes at a merchant site separate from the internet service provider for transactions conducted between the merchant site and one or more users of the network;
- associating the anonymized identifier with the collected data and the one or more transaction codes;
- creating a transaction record including the one or more transaction codes and the anonymized identifier; and
- storing the transaction record in a database separate from the internet service provider and merchant site.

16. The method of claim 15, wherein said transaction codes are selected to represent a behavior pattern of users at a merchant website.

17. The method of claim 16, wherein said transactions codes are assigned by merchant websites.

18. The method of claim 16, wherein said transaction codes represent at least one of the type of purchase made by a user, method of payment made by a user and price range of purchase made by a user.

* * * * *